United States Patent [19]

Rule et al.

[11] 4,351,852

[45] Sep. 28, 1982

[54] LOW CALORIE CAKE BATTER OR MIX

[75] Inventors: Charles E. Rule, Lakewood; Cecilia Gilmore, Strongsville; Eugene J. Stefanski, Garfield Heights, all of Ohio

[73] Assignee: SCM Corporation, New York, N.Y.

[21] Appl. No.: 170,609

[22] Filed: Jul. 21, 1980

[51] Int. Cl.$^3$ ............................................. A21D 10/00
[52] U.S. Cl. ..................................... 426/554; 426/553; 426/653; 426/654; 426/804
[58] Field of Search ............... 426/553, 611, 613, 653, 426/654, 24, 554; 252/356

[56] References Cited

U.S. PATENT DOCUMENTS

| 3,702,307 | 11/1972 | Norris | 426/653 |
| 3,995,069 | 11/1976 | Harries | 426/653 |
| 4,199,608 | 4/1980 | Gilmore et al. | 426/613 |
| 4,242,366 | 12/1980 | Morgan et al. | 426/653 |

OTHER PUBLICATIONS

Mattil, *Bailey's Industrial Oil and Fat Products*, Interscience Publishers, N.Y., 1964, pp. 379–381.

*Primary Examiner*—Raymond N. Jones
*Assistant Examiner*—Elizabeth A. Hatcher
*Attorney, Agent, or Firm*—Richard H. Thomas

[57] ABSTRACT

A chemically leavened cake batter or mix comprising cake making ingredients including flour and sugar intimately blended with a mono- and diglyceride emulsifier, in effective amounts, a major constituent of the emulsifier being diglyceride in the weight proportion of about 38–48%, the triglyceride content being less than the mono- and diglyceride contents combined, the ratio of diglyceride to monoglyceride being about 5:1 to about 1.5:1.

9 Claims, No Drawings

LOW CALORIE CAKE BATTER OR MIX

The present invention relates to novel low-calorie cake batters and mixes which can be made free of added fat, giving a substantially reduced calorie content without corresponding loss of desirable physical properties. The present invention resides principally in the use of a special partial glycerol ester emulsifier which is capable of use as the sole lipid employed in the cake batter or mix. The invention will be described particularly with respect to chemically leavened, high-ratio batters or mixes, and has specific application in the preparation of batters and mixes for such cakes as chocolate cake, yellow cake, devils food cake, souffle cake and white cake.

BACKGROUND OF THE INVENTION

Low-calorie cake preparations are known and on the market today. However, all cake preparations, whether low calorie or not, have a relatively high lipid or fat content, e.g., added as a shortening, to obtain certain functional properties. Fat is one of the most concentrated forms of energy in the diet, each gram of fat supplying approximately nine calories. Overall, fat constitutes about 40% of the total calorie intake in a diet. If the lipid content of a cake preparation could be lowered without decrease in functional properties, this could be of considerable help to those seeking to reduce their calorie consumption.

Generally, the function of an emulsified shortening is to obtain improved cake volume, grain, and texture in the final baked product. Particularly in the case of high-ratio cakes, wherein the sugar content is at least equal to or greater than the flour content, the emulsified shortening is a very critical ingredient towards obtaining uniformly light and tender texture in combination with a degree of moistness. Generally speaking, the ability of a batter to hold air beaten into it is largely dependent upon the emulsifying properties of the shortening employed.

Prior U.S. Pat. No. 3,011,896, assigned to assignees of the present application, describes a novel fluid shortening which is especially valuable for making "high-ratio" cakes. The shortening consists essentially of about 0.2–3% unlactylated, normally solid glyceride; about 89–95.8% normally liquid glyceride vehicle; and about 4–8% lactylated monoglyceride-providing composition defined as the esterification product of lactic acid with at least one concentrated, preformed monoglyceride of a $C_{14-22}$ fatty acid. The patent is very clear on the functional properties required of a shortening composition. The disclosure of prior U.S. Pat. No. 3,011,896 is incorporated by reference herein. The shortening of this patent is marketed under the trademark "Fluid-Flex".

In prior application Ser. No. 924,701, filed July 14, 1978, now U.S. Pat. No. 4,199,608, assigned to assignees of the present application, there is disclosed a novel partial glycerol ester emulsifier in which a major constituent of the emulsifier is diglyceride, present in an amount of about 38–48%. The triglyceride content is less than the mono- and diglyceride contents combined, but may be about equal to the diglyceride content, the balance being essentially monoglyceride.

In accordance with the invention of the '608 patent, it was found that this emulsifier could be employed as a replacement for the normal fat content in imitation dairy products to substantially reduce the caloric content of such products and produce low-calorie products. Examples of products covered in the said copending application are whippable toppings, sour cream, coffee whitener, mellorine, chip dip and cream cheese. Such compositions were capable of either liquid or dry mix formulation, the latter being readily reconstituted by admixture with water or milk.

Although added fat and other emulsifiers could be used in the compositions of the '608 patent, it was a feature of the invention thereof that the novel partial glyceride emulsifier could constitute the sole lipid employed in the compositions.

SUMMARY OF THE PRESENT INVENTION

The present invention resides in the discovery of low calorie cake batter or mix formulations that contain a novel partial glyceride ester emulsifier and may be substantially free of additional triglycerides. Specifically, the present invention resides in the discovery that the caloric content of cake batters or mixes can be significantly reduced by replacement of the normal fat content with a partial glycerol ester emulsifier, the major constituent of which is diglyceride, present in an amount of about 38–48%. The triglyceride content is less than the amount of mono-glyceride and diglyceride combined but may be equal to the diglyceride content. The ratio of diglyceride to monoglyceride is in the range of about 5:1 to about 1.5:1. The emulsifier may contain small amounts of free glycerine and free fatty acids (generally less than 1%).

For purposes of the present application, all percentages and ratios are on a weight basis unless otherwise specified.

The partial glyceride ester emulsifier is usable in an effective amount sufficient to obtain the properties desired; namely, improved cake volume, grain, and texture. Preferably, the emulsifier is used in an amount of about 10–25% based on the weight of flour employed (following conventional bakery practice). By contrast, a conventional cake formulation may employ about 40–60% (flour weight basis) of a fluid shortening. Thus, by the present invention, the lipid content in the cake formulation may be reduced by at least about 50%. At the same time, the present invention provides a composition having all of the desirable attributes required of conventional cake batters or mixes. For instance, the product of the present invention has good flavor and eating qualities, good volume in terms of cc's per gram, and good mixing time. The emulsifier of the present invention is capable of being dry-blended in the preparation of dry mixes, or alternatively can be employed in a batter formulation in a continuous "wet" process for manufacture of cake products.

It is understood that additional lipids or fat can be employed in combination with the emulsifier of the present invention, and other emulsifiers, if desired, to obtain various properties. For instance, as little as 5% emulsifier can be employed with a conventional amount of a partially hydrogenated vegetable fat or non-emulsified shortening to provide an excellent cake product. However, the fact remains that excellent properties can be achieved by use of the emulsifier of the present invention alone, in an amount as low as about 15% (flour weight basis), with no additional lipids or other emulsifiers.

Preferably, the partial glycerol ester emulsifier of the present invention has about 10% to about 30% monoglyceride, about 38% to about 48% diglyceride, and about 23% to about 46% triglyceride. On this basis, it can be seen that the actual triglyceride content in a cake batter or mix can be as low as about 3.5% (0.23×0.15) flour weight basis compared with conventional formulations containing about 40-60% fat. Further defining the partial glycerol ester emulsifiers of the present invention, they have an I.V. in the range of about 50 to about 85, a Capillary Melting Point (CMP) in the range of about 105° F. to about 120° F., and a soft or hard consistency.

Additional ingredients employed in the cake compositions of the present invention in effective amounts (defined as cake making amounts) comprise cake flour, salt, baking powder, a protein such as milk powder, a sweetening agent such as sugar, water, whole eggs, or egg white, and flavor. The cake batters or mixes according to the present invention can be prepared, for example, by thoroughly blending together the usual batter or mix ingredients with the improved plastic emulsifier of the present invention; preferably before the addition of liquid ingredients such as water, milk, eggs, flavoring and the like.

An example of one plastic partial glycerol emulsifier within the scope of the present invention is disclosed in Bailey's *Industrial Oil and Fat Products*, Third Edition, Interscience Publishers, a Division of John Wiley and Sons, New York, page 955, Table 19.3. The emulsifier contains about 18% monoglyceride, about 48% diglyceride and about 34% triglyceride. The disclosure of this publication is incorporated by reference herein. Another example is Dur-Lo (trademark, SCM Corporation), a mono-diglyceride which is low in alpha mono content (about 17-22%) and relatively high in diglyceride content. Specifications for Dur-Lo are a Mettler Dropping Point at 1° C./min. of 40.0-41.5 and an I.V. of 68-72.

The emulsifier of the present invention can be a soft or hard mono-diglyceride prepared by blending together three partial glycerol ester fractions; a mono-diglyceride having a low monoglyceride content, which shall be referred to, for purposes of this application, as the (low mono) mono-diglyceride fraction; a soft mono-diglyceride; and a smaller amount of a hard mono-diglyceride. Up to 10% hard mono-diglyceride (based on the total lipid content) can be used although the hard mono-diglyceride preferably is employed in amounts as low as about 1-2% to obtain the properties desired. Varying the hardness of the triglyceride can produce either a soft or hard mono-diglyceride. In one embodiment, there was prepared a blend containing three lipid fractions; about 74.2% of a (low mono) mono-diglyceride made from 70 I.V. soybean oil having a monoglyceride content of only about 13%, a diglyceride content of about 43% and a triglyceride content of about 43%; about 24.7% of a soft mono-diglyceride having a monoglyceride content of about 40-48%, a diglyceride content of 40-48% and a triglyceride content of 8-12%; and about 1.1% of a hard mono-diglyceride having a monoglyceride content of about 40-48%, a diglyceride content of 40-48% and a triglyceride content of 8-12%. The soft and hard mono-diglycerides are marketed by SCM Corporation under the trademarks Dur-em 114 (made from a 75-85 I.V. soybean oil, and has a CMP of 110°-125° F.) and Dur-em 117 (made from 5 max. I.V. soybean oil, and has a CMP of 145°-150° F.), respectively. These emulsifier fractions in the proportions stated gave combined mono-, di- and triglyceride contents of about 22%, 43% and 35%, respectively. The lipid blend may contain up to about 1% free glycerin and free fatty acids. In this particular example, the lipid blend had a Capillary Melting Point of about 109° F. and an I.V. of about 72. Other commercially available monoglycerides such as Dur-em 204 and Dur-em 207 (trademarks, SCM Corporation, both containing about 50-60% monoglyceride) and Myverol 18-06 and 18-85 (trademarks, Eastman Chemical, containing about 90% monoglyceride), can be used for blending with the (low mono) mono-diglyceride. The advantage of the use of the several partial glycerol ester emulsifier fractions was that the combination provided good cake volume which was retained over an acceptable period of time. The desired ratio of diglycerides to monoglycerides was controlled primarily by adjustment of the amount of the (low mono) mono-diglyceride fraction.

Alternatively, the (low mono) mono-diglyceride may be employed, alone or in a blend with the (soft mono) mono-diglyceride alone.

The partial glycerol esters useful in accordance with the concepts of the present invention are generally a mixture of unsaturated and saturated glyceryl esters of fatty acids typically derived from partially hydrogenated liquid vegetable oils such as soybean oil, cottonseed oil, corn oil, olive oil, peanut oil, safflower oil, coconut oil, and like vegetable oils; plastic fats such as tallow, lard and palm; and blends of the same. The mono-diglyceride of the present invention may be hydrated to a limited degree and offer application advantages.

Small amounts of additional conventional aeration type adjunct emulsifiers are not necessary, although their use is not precluded. For instance, the composition of the present invention could also employ, if desired, an ethoxylated fatty acid ester such as an ethoxylated mono- and diglyceride (the polyethoxylated fatty acid esters of glycerol as described in Egan U.S. Pat. No. 3,433,645).

Such ethoxylated monoglycerides have hydroxyl values of about 65 to 80, a saponification number of about 65 to 75, acid values less than about 2 and an oxyethylene content of about 60 to 65 weight percent based on the total ethoxylated glycerides composition. The Capillary Melting Point of the ethoxylated mono- and diglycerides is between about 75° to 95° F. and preferably between about 80° to 90° F. Ethoxylated monoglycerides may be prepared by reacting ethylene oxide with a mono- and diglyceride mixture at temperatures of about 145° to 175° C., such as suggested in the Egan U.S. Pat. No. 3,490,918. One suitable ethoxylated mono- and diglyceride that may be employed in the present invention is Santelle EOM (trademark, Durkee Foods Division of SCM Corporation). This emulsifier is manufactured from hydrogenated vegetable oils and has an acid value maximum of 2.0, an hydroxyl value of 60-80, an I.V. number based on fatty acid content of 3 maximum, an oxyethylene content of 60.5-65.0% and a saponification number of 65-75.

Representative of other polyoxyethylene-containing fatty acid esters useful in the present invention are the polysorbates such as polyoxyethylene sorbitan distearate, polyoxyethylene sorbitan monostearate, polyoxyethylene isosorbide dipalmitate, polyoxyethylene sorbitan tristearate as well as other similar ethoxylated fatty acid esters of ethoxylated hexitols, hexitans and isohexides. One such emulsifier is polysorbate 60 (polyoxyethylene (20) sorbitan monostearate).

It is also possible to employ in the composition of the present invention a polyglycerol ester of fatty acids such as 3-1-SH (triglycerol mono shortening), or the "Fluid-Flex" shortening of prior U.S. Pat. No. 3,011,896 (supra), as well as the other glycerol lacto-esters described in the '896 patent.

The amount employed of such adjunct emulsifiers is known technology, and generally would be very small, keeping in mind the fact that the mono- and diglyceride of the present invention can be used alone, without any additional emulsifiers, to give excellent aeration as well as emulsion stability.

The formulation of the present invention may also comprise a di- or triglyceride vehicle such as a refined partially hydrogenated soybean or cottonseed oil or non-emulsified shortening, again employing known technology. One such shortening is a partially hydrogenated vegetable oil (soybean, palm, cottonseed), having about 88–92% hydrogenated soybean oil, a Wiley Melting Point of 111°–119° F., and an SFI 25 maximum at 70° F., 19 maximum at 92° F., and 10 min. at 104° F. The shortening is marketed under the trademark Creamtex by SCM Corporation.

The following examples will serve to illustrate the preparation of several embodiments according to the present invention, as well as their use in the preparation of cake batters and cakes, and the benefits derived therefrom.

EXAMPLE I

Two cake batters formulas were used containing conventional amounts of cake flour, salt, baking powder, milk powder, sugar, water, whole eggs, and flavor; sample A containing Fluid-Flex shortening of prior U.S. Pat. No. 3,011,896; sample B containing no vegetable fat and only the mono- and diglyceride of the present invention (having the identification D-2-2667):

| Ingredients | Sample A Grams | % | Sample B Grams | % |
|---|---|---|---|---|
| Cake flour | 1134 | | | |
| Salt | 28.34 | | | |
| Baking powder | 70.87 | | | |
| Milk powder | 113.4 | | | |
| Sugar | 1360.8 | | | |
| Shortening (Durkee Fluid-Flex) soybean oil, glycerol-lacto esters of fatty acids, mono and di-glycerides | 453.6 | 40 | — | |
| Mono- and diglycerides (D-2-2667) | — | | 198.4 | 17.5 |
| Water | 907.2 | | | |
| Whole eggs | 680.4 | | | |
| Flavor | 28.35 | | | |

The percentages given follow conventional bakery practice and are based on total flour as 100%. The percent emulsifier employed was less than half the percent of Fluid-Flex shortening employed. The percentages of ingredients in Sample B are the same as in Sample A except, as indicated, the shortening (Fluid Flex) is replaced by the mono- and diglyceride (D-2-2677).

The following procedure was employed. The dry ingredients were blended thoroughly, including the cake flour, salt, baking powder, milk powder, and sugar. In the case of sample B, the mono- and diglyceride of the present invention was also blended into the dry mixture. In the case of sample A, the shortening, water, whole eggs and flavor were blended together and then added to dry ingredients. Otherwise, mixing and blending were conventional.

A subjective scoring system was employed in ascertaining the quality characteristics of the cakes, as follows:

TABLE I

| | Weight (grams) | Volume (cc) | cc/grams |
|---|---|---|---|
| Baked cake with Fluid-Flex (Sample A) | 322 | 1200 | 3.73 |
| Baked cake with mono- and diglycerides (Sample B) | 323 | 1225 | 3.79 |

The mono- and diglyceride content in Sample B gave a calorie content about one half that resulting from the use of shortening in sample A. At the same time, the above data shows that the cake manufactured according to the concepts of the present invention had equivalent volume. In addition, the cake of the present invention had equally good texture, grain and color as that prepared using the Fluid-Flex shortening.

In this example, the mono-diglyceride emulsifier was a blend of a "low mono" mono-diglyceride and two commercial partial glyceride emulsifiers, as follows:

| | |
|---|---|
| Mono-diglyceride (low mono) made from 70 I.V. soybean oil (monoglyceride 13%, diglyceride 43%, triglyceride 43%). | 73–75% |
| Dur-em 114, trademark, SCM Corp., mono-diglyceride made from 75–85 I.V. soybean oil (monoglyceride 40–48%, diglyceride 40–48%, triglyceride 8–12%) | 24–26% |
| Dur-em 117, trademark, SCM Corp., mono-diglyceride made from 0–5 I.V. soybean oil (monoglyceride 40–48%, diglyceride 40–48%, triglyceride 8–12%). | 0.5–1.5% |

The lipid composition calculated to be about 22% mono- 43% di- and 35% triglycerides, with up to about 1% free glycerin and free fatty acids.

EXAMPLE II

In this Example cakes from cake batters prepared according to the concepts of the present invention were subjected to a large number of subjective tests and scored. Similar tests were carried out on a control formulation. At a level of about 16% mono-diglyceride of the present invention, based on flour weight, the cakes were found to score well in all categories. Thirty-three subjective tests in all were employed, using five separate scorers in each test. A number of the tests were only remotely related to shortening or emulsifier content, such as a number of flavor and aroma tests. However, many of the tests were directly related. These were: volume (as subjectively determined); peaking or dipping in the cake; flatness vs unevenness; shrunken appearance; leathery surface; existance of what is known as a water ring; hardened crust; tough crust; open or tight grain; coarse grain; tough or tender texture; dry or soggy texture; and too doughy or spongy, and sugar migration. Based on a maximum of 103, the cakes received an acceptable score of 90.8. A similar scoring was obtained with the control cakes.

Cake volume (actual) of the cake of the present invention was determined to be 3.75 cc per gram.

The cake formulae employed were as follows:

|  | Inventive Cake | | |
|---|---|---|---|
| Ingredients | Batch Weight | Control Batch Weight | Percent based approx |
| Cake flour | 322 | 300 | |
| Salt | 10 | 9 | |
| Baking powder | 19 | 18 | |
| Non-fat milk solid | 32 | 30 | |
| Sugar | 382 | 360 | |
| Mono-diglyceride emulsifier of Examples | 51 | — | 16% |
| Water | 290 | 270 | |
| Whole eggs | 161 | 150 | |
| Flavor | 3 | 3 | |
| Fluid-Flex | — | 135 | 45% |

The cakes were prepared by adding all dry ingredients to a bowl and thoroughly mixing the same. Half of the water was then added and mixing continued. The eggs, water and vanilla were then added in that sequence, all followed by mixing. Conditions of mixing and temperatures were carefully controlled and followed normal practice. Baking was carried out for about 22 minutes at about 350° F.

Limits as to the amount of mono-diglyceride emulsifier that can be used are somewhat subjective. Cakes prepared the same day under the same conditions and with the same formulation but containing only about 12% of the inventive mono-diglyceride (based on flour weight) were found to be too low in emulsifier, and scored only about 80; being low in such categories as volume, surface and crust characteristics. However, it should be understood that the tests were subjective and optimization was not attempted at the 12% level either as to mono-diglyceride formulation or cake formulation. Also different products require different characteristics. Similarly, at a level of about 20% mono-diglyceride the cake was found to be too tender and crumbling was experienced. Again, optimization was not attempted.

EXAMPLE III

This example illustrates preparation of cake batter products employing varying amounts of mono-diglyceride of the present invention in combination with about 12% non-emulsified plastic shortening. The shortening employed was Creamtex, described above.

The same cake formula as in Example 2 was used. Conditions of mixing and baking were the same as in Example II, as was scoring. The percentage weights are based on flour weight.

TABLE II

| Sample | Percent Mono-diglyceride Emulsifier | Percent Creamtex Shortening | Sample Scoring |
|---|---|---|---|
| 8E | 12% | 12% | 90.2 |
| 9E | 16% | 12% | 93.2 |
| 10E | 21% | 12% | 92.4 |
| 11E | 16% | 12% | 94.4 |

From Table II, it can be seen that all of the cakes scored favorably (above 90). By way of example, Sample 9E had an actual volume of about 4 cc per gram. Samples 9E and 11E employed the same formulation but received slightly different subjective scores.

The data of Table II establishes that by use of an amount of a non-emulsified shortening, as little as 12% of the mono-diglyceride of the present invention may be used.

It should be noted that the combined weights of emulsifier and shortening in these samples provides a total lipid weight far less than conventionally employed in cake batters, e.g., 28% (Samples 9E and 11E) vs 40% plus, based on flour weight, for conventional cake batters. The significance of the present invention should thus be further evident from these samples.

EXAMPLE IV

In this example, a very low level of mono-diglyceride emulsifier of the present invention was employed with a conventional amount of non-emulsified shortening. The same formulation as in Example II was used except that it contained about 43% of the Creamtex shortening and only 5% of the special mono-diglyceride emulsifier, for a total lipid content of about 48%, based on flour weight. Percentages of other ingredients were appropriately adjusted. Cakes were prepared as in Example II and received a subjective scoring of 90.5. By comparison, cakes prepared the same day under the same conditions employing two conventional cake shortenings (Betrkake, marketed by SCM Corporation, and Super Quik Blend marketed by Hunt-Wesson Corporation) received subjective scorings of 93 and 90.25, respectively. Thus, the cakes of this example (using the special mono-diglyceride) compared favorably.

One would not normally use a formulation containing a total lipid content of 48% with the special mono-diglyceride of the present invention since this is use of more fat than is necessary. However, this example, in combination with the other examples herein, does illustrate utility of the mono-diglyceride of the present invention at widely varying levels of usage.

EXAMPLE V

This example illustrates preparation of fat replaced dry mix Devil's Food cakes according to the concepts of the present invention. The following inventive cake and control formulations were employed.

| Ingredients | Control % | Inventive Cake Reduced Fat % |
|---|---|---|
| Fluid-Flex | 8.6 | — |
| Dur-Lo | — | 4.5 |
| Cake Flour | 21.5 | 21.4 |
| Sugar | 25.8 | 25.7 |
| Cocoa | 4.3 | 4.3 |
| Salt | 0.6 | 0.6 |
| Baking Powder | 1.0 | 1.0 |
| Baking Soda | 0.3 | 0.3 |
| Dry Milk Solids | 2.5 | 2.5 |
| Dry Whole Eggs | 2.8 | 2.8 |
| Dry Egg Whites | 0.3 | 0.3 |
| Cellulose Gum | 0.1 | 0.3 |
| Water | 32.2 | 36.3 |
|  | 100 | 100 |

Based on cake flour weight, the amount of Fluid-Flex used in the control was 40%; whereas the amount of mono-diglyceride of the present invention used in the fat-replaced samples was only 21%.

The samples were prepared by batching the dry ingredients, adding the lipid and mixing the same. Water was then added in three steps, each addition being followed by mixing. Baking was at conventional temperatures.

The fat-replaced cake of the present invention had a cake specific volume of 3.97 compared with 3.40 for the control. Both cakes could be characterized as tender, even grained and symmetrical. No tunneling was experienced.

EXAMPLE VI

This example illustrates preparation of a yellow cake from a batter in accordance with the concepts of the present invention. The following reduced-fat and control formulations were employed.

| Ingredients | Inventive Cake Reduced Fat % | Control % |
|---|---|---|
| Fluid-Flex | | 10.50 |
| Dur-Lo | 4.0 | — |
| Flour | 25.26 | 23.55 |
| Sugar | 30.37 | 28.30 |
| Milk Solids | 2.52 | 2.35 |
| Salt | 0.80 | 0.75 |
| Baking Powder | 1.5 | 1.4 |
| Water | 11.37 | 10.6 |
| Whole Eggs | 12.61 | 11.75 |
| Water | 11.37 | 10.6 |
| Vanilla | 0.20 | 0.20 |

Mixing was carried out by first blending the dry ingredients and lipid, followed by a first water addition, medium speed mixing, whole egg addition, continued mixing, final water addition and final mixing, in that order.

The control cake had a lipid content, based on flour weight, of 44.6%; whereas the cake of the present invention had a lipid content of only about 16%.

Specific volume for the control cake was 3.87; that for the inventive cake was 3.75.

In the preparation of cakes from the cake batters and mixes of the present invention, it was found that the mono- and diglyceride emulsifier offered both excellent stability and aeration. With both batter and cake mixes, the air was dispersed throughout the cakes as fine droplets giving an excellent, stable, foam structure; and tunneling was not experienced. Similarly, the sugar remained well dispersed and sugar migration was not experienced.

The effectiveness of the emulsifier of the present invention with cake batter formulations was particularly surprising. Generally, a conventional cake batter formulation will have a higher fat content than a conventional cake mix formulation. Thus, use of the mono-diglyceride emulsifier of the present invention will result in a somewhat greater reduction in lipid level than with a cake mix formulation, increasing the importance of the structure-building requirements of the lipid. This fact coupled with the stresses conventionally imposed on cake batter products, such as handling stresses, longer shelf life, and freeze/thaw stability makes the capabilities of the emulsifier more critical. The emulsifier of the present invention met all criteria.

What is claimed is:

1. A substantially fat-free, defined as added fat, chemically leavened cake batter or mix, of the type which normally contains a substantial amount of shortening, as distinguished from a sponge cake, comprising cake making essential ingredients, consisting essentially of flour, sugar and eggs, intimately blended with mono- and diglyceride emulsifier, in effective amounts to obtain good volume, grain and texture, the diglyceride being present in the weight proportions of about 38–48%, based on emulsifier weight and a triglyceride content less than the mono- and diglyceride contents combined, the ratio of diglyceride to monoglyceride being about 5:1 to about 1.5:1.

2. The cake batter or mix of claim 1 comprising a mono- and diglyceride emulsifier having an I.V. of about 50–85 and a Capillary Melting Point of about 105°–120° F.

3. The cake batter or mix of claim 2 wherein said partial glycerol ester emulsifier contains about 10% to about 30% monoglyceride, about 38–48% diglyceride, and about 23% to about 46% triglyceride.

4. The cake batter or mix of claim 3 wherein said emulsifier is present in an amount as low as about 15% based on flour weight.

5. The cake batter or mix of claim 3 wherein said partial glycerol ester emulsifier is a blend comprising about 5–25% soft mono-diglyceride, and about 1–2% hard mono-diglyceride, and about 60–95% mono- and diglyceride having a low monoglyceride content of less than about 15%.

6. The cake batter or mix of claim 5 wherein said hard mono-diglyceride has a Capillary Melting Point of about 145°–150° F. and said soft mono-diglyceride has a Capillary Melting Point of about 110°–125° F.

7. The cake batter or mix of claim 3 further including a non-emulsified glyceride oil shortening, the emulsifier and shortening being present in effective amounts.

8. The cake batter or mix of claim 7 wherein said emulsifier is present in an amount of at least about 5% based on flour weight.

9. A low calorie, chemically leavened cake batter or mix of the type which normally contains a substantial amount of shortening, as distinguished from a sponge cake, comprising cake making essential ingredients consisting essentially of flour, sugar, and eggs intimately blended with a minor amount of shortening and mono- and diglyceride emulsifier, in effective amounts to obtain good volume, grain and texture; the diglyceride content being about 38–48% based on total emulsifier weight; the ratio of diglyceride to monoglyceride being about 5:1 to about 1.5:1; the triglyceride content from emulsifier being less than the mono- and diglyceride contents combined; the total lipid content of the batter or mix being not substantially greater than about 28% based on flour weight.

* * * * *